(12) United States Patent
Burke et al.

(10) Patent No.: US 12,319,372 B2
(45) Date of Patent: Jun. 3, 2025

(54) BOOSTER OVERLOAD PREVENTION

(71) Applicant: Brandt Industries Canada Ltd., Regina (CA)

(72) Inventors: Brett Burke, Edmonton (CA); Jashanpreet Singh, Nisku (CA); Adrien Desmarais, Nisku (CA)

(73) Assignee: Brandt Industries Canada Ltd., Regina (CA)

( * ) Notice: Subject to any disclaimer, the term of this patent is extended or adjusted under 35 U.S.C. 154(b) by 126 days.

(21) Appl. No.: 18/142,608

(22) Filed: May 3, 2023

(65) Prior Publication Data
US 2024/0367737 A1 Nov. 7, 2024

(51) Int. Cl.
*B62D 61/12* (2006.01)
*B62D 53/06* (2006.01)

(52) U.S. Cl.
CPC ........ *B62D 61/125* (2013.01); *B62D 53/061* (2013.01)

(58) Field of Classification Search
CPC .. B62D 61/125; B62D 53/061; B62D 53/005; B62D 53/068; B62D 53/0864; B60G 2300/042; B60G 2500/30; B60G 2500/202; B60G 2500/204
USPC ...................................................... 180/24.02
See application file for complete search history.

(56) References Cited

U.S. PATENT DOCUMENTS

| | | | | |
|---|---|---|---|---|
| 6,845,989 B2* | 1/2005 | Fulton | ................ | B60G 17/0526 |
| | | | | 280/124.16 |
| 7,320,469 B2* | 1/2008 | Bromley | ............ | B60G 17/0523 |
| | | | | 280/5.514 |
| 7,661,681 B1* | 2/2010 | Zork | ....................... | B60G 9/003 |
| | | | | 280/5.514 |
| 7,841,608 B2* | 11/2010 | Morris | ............... | B60G 17/0523 |
| | | | | 280/124.16 |
| 10,611,206 B2* | 4/2020 | Zawacki | ............... | B60W 30/02 |
| 11,241,923 B2* | 2/2022 | Johnston | ............... | B62D 61/10 |

(Continued)

FOREIGN PATENT DOCUMENTS

| CA | 3066770 A1 | 10/2023 |
|---|---|---|
| WO | WO 2018156606 | 8/2018 |

OTHER PUBLICATIONS

NITRO Stinger, Operating Manual, Web Page at https://www.tmtrailersales.com/pdf/LANDOLLNITRO_op.pdf, 22 pages.

*Primary Examiner* — Paul N Dickson
*Assistant Examiner* — Caitlin Anne Miller
(74) *Attorney, Agent, or Firm* — Frost Brown Todd LLP; Nicole M. Tepe (57) ABSTRACT

A trailer system with a trailer and a booster is provided. The trailer can have a hitch assembly provided at a front end of the trailer, a load bed provided behind the hitch assembly, and an axle assembly. The booster can have a connection assembly pivotally connecting the booster to a rear end of the trailer and an axle assembly. The connection assembly can include a booster hydraulic cylinder to dampen the pivoting of the booster; and an axle assembly comprising: a booster suspension frame; at least one axle; ground wheels provided on each axle; a booster suspension having at least one booster suspension air spring controlling the height of the booster suspension frame relative to the ground wheels; and a pressure regulator limiting the maximum pressure of a fluid supplied to the at least one booster suspension air spring.

30 Claims, 9 Drawing Sheets

(56) References Cited

U.S. PATENT DOCUMENTS

| | | | |
|---|---|---|---|
| 2019/0270488 A1* | 9/2019 | Behrens | B62D 53/005 |
| 2022/0097781 A1* | 3/2022 | Poole | B62D 53/061 |

* cited by examiner

BOOSTER OVERLOAD PREVENTION

The present invention relates to booster for a trailer system and more particularly a booster having an air suspension that limits the pressure in the air suspension to try and prevent overload conditions.

BACKGROUND

Boosters are used to support a heavy haul trailer. The booster connects to a rear end of a trailer and takes up some of the weight of the load on the trailer, reducing the weight of the load on the axles of the trailer. The use of a booster with a trailer can allow a heavier load to be hauled on the trailer by creating additional axle spread and reducing the load on each of the axles.

These boosters have systems that will typically try and keep a constant load on the axles when variations in the road surface are experienced. One of these systems is an air suspension coupled with a hydraulic accumulator. The air suspension tries to maintain a desired ride height for the booster and the hydraulic accumulator dampens articulation of the booster relative to the trailer. However, when the booster is in an elevated position relative to the trailer, the effective load on the booster is increased. This increased effective load can cause the system on the booster to increase the pressure in the air suspension of the booster in order to compensate for this increased effective load. This in turn can decrease the load carried by the axles and wheels on the trailer and thereby the friction between the wheels of the trailer and the road surface. This can lead to an instability condition being reached between the trailer and the booster and the booster can start affecting the direction of travel of the trailer, causing the booster to "steer" or push the trailer off the road or worse.

SUMMARY OF THE INVENTION

In a first aspect, a trailer system is provided that includes a trailer and a booster. The trailer can comprise: a front end; a rear end; a hitch assembly provided at the front end of the trailer; a load bed provided behind the hitch assembly; and an axle assembly. The booster can comprise: a connection assembly pivotally connecting the booster to a rear end of the trailer wherein the booster can pivot around a first axis oriented substantially horizontal relative to the rear end of the trailer, the connection assembly comprising a booster hydraulic cylinder to dampen the pivoting of the booster around the horizontal axis; and an axle assembly comprising: a booster suspension frame; at least one axle; ground wheels provided on each axle; a booster suspension having at least one booster suspension air spring controlling the height of the booster suspension frame relative to the ground wheels; and a pressure regulator limiting the maximum pressure of a fluid supplied to the at least one booster suspension air spring.

In a second aspect, a booster for connection behind a trailer is provided. The booster can include a connection assembly pivotally connectable to a rear end of the trailer wherein the booster can pivot around a first axis oriented substantially horizontal relative to the rear end of the trailer, the connection assembly comprising a booster hydraulic cylinder to dampen the pivoting of the booster around the horizontal axis and an axle assembly comprising: a booster suspension frame; at least one axle; ground wheels provided on each axle; a booster suspension having at least one booster suspension air spring controlling the height of the booster suspension frame relative to the ground wheels; and a pressure regulator limiting the maximum pressure of a fluid supplied to the at least one booster suspension air spring.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
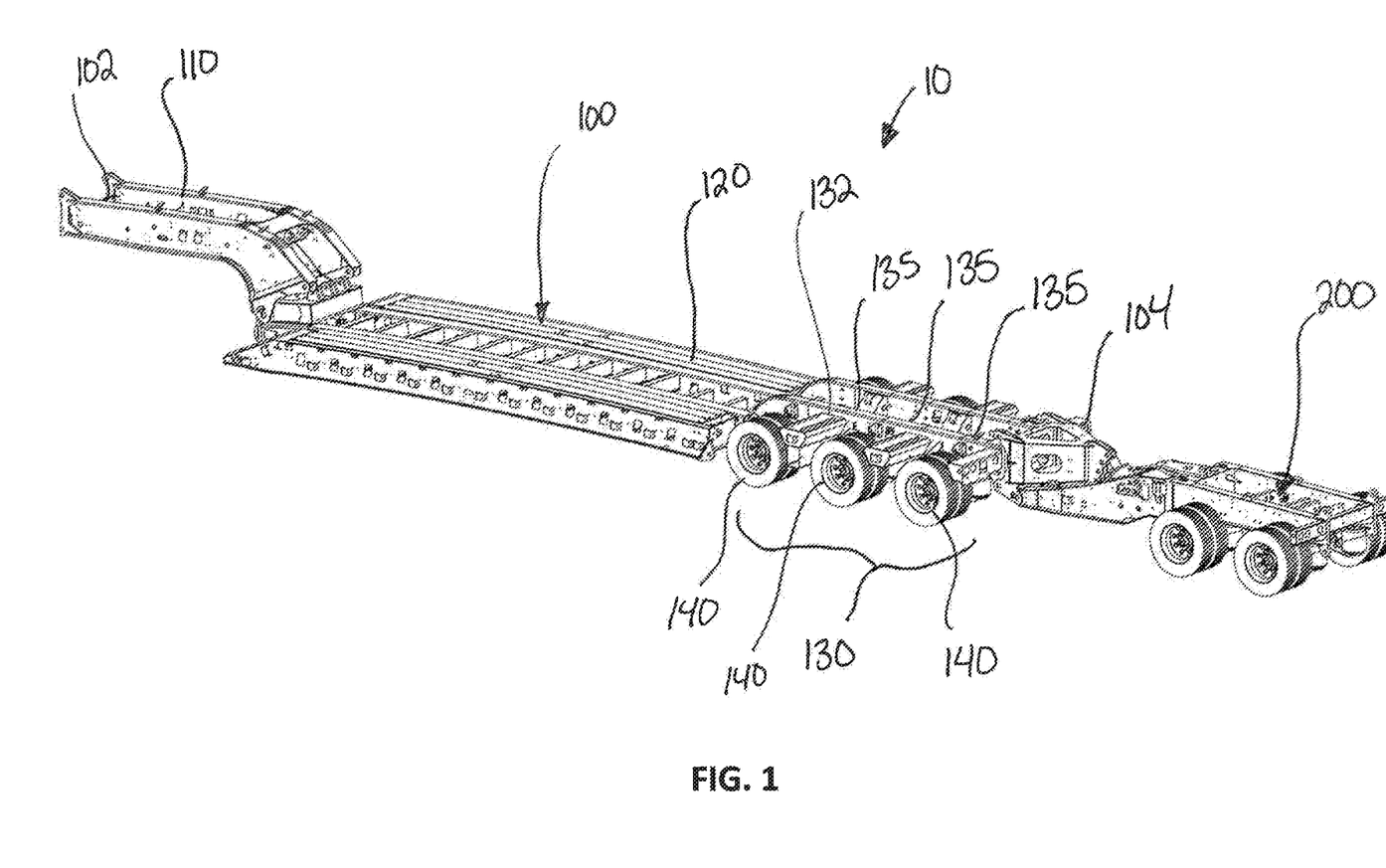
FIG. 1 is a isometric view of a trailer system.
Figure 2:
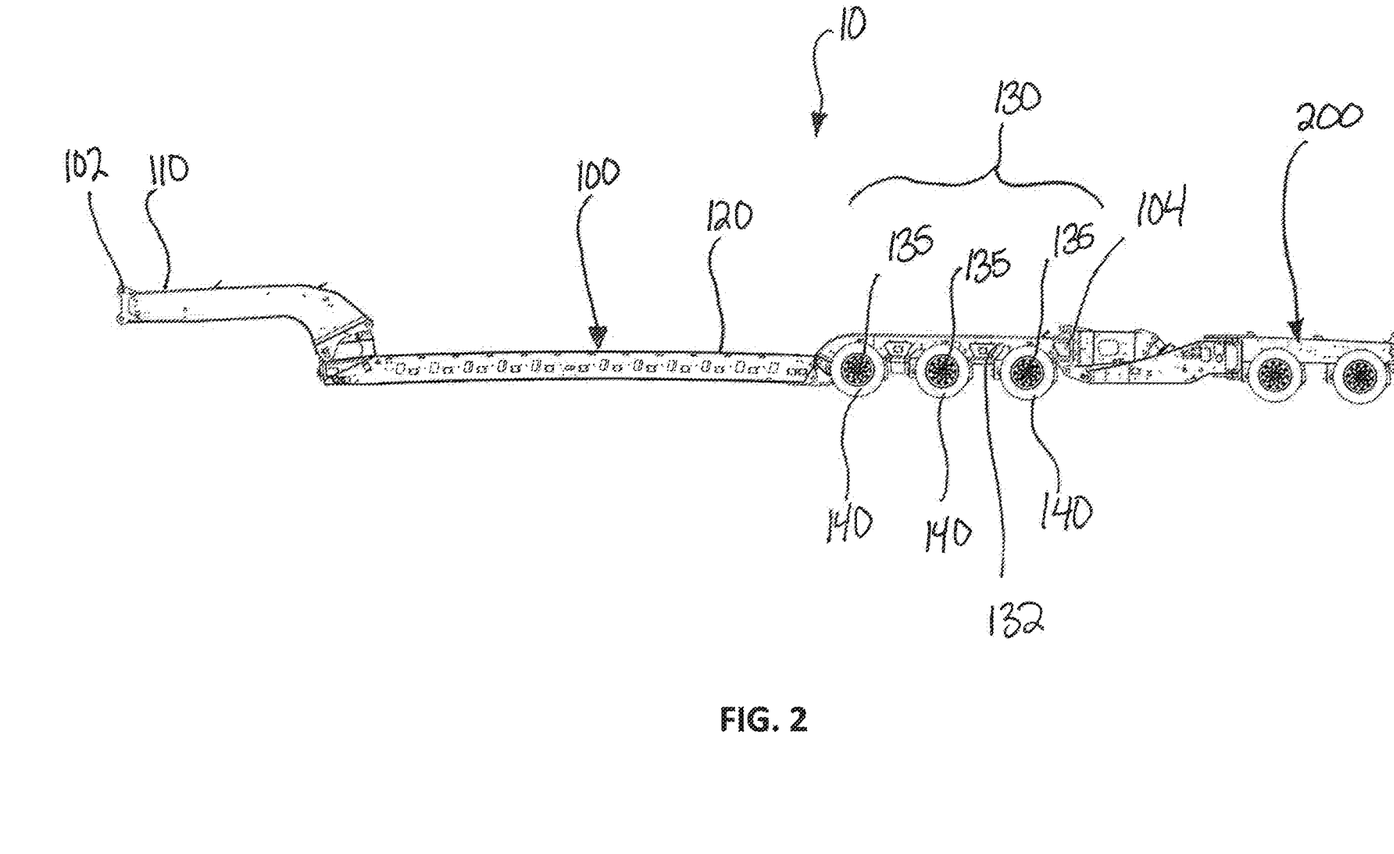
FIG. 2 is a side view of a trailer system.
Figure 3:
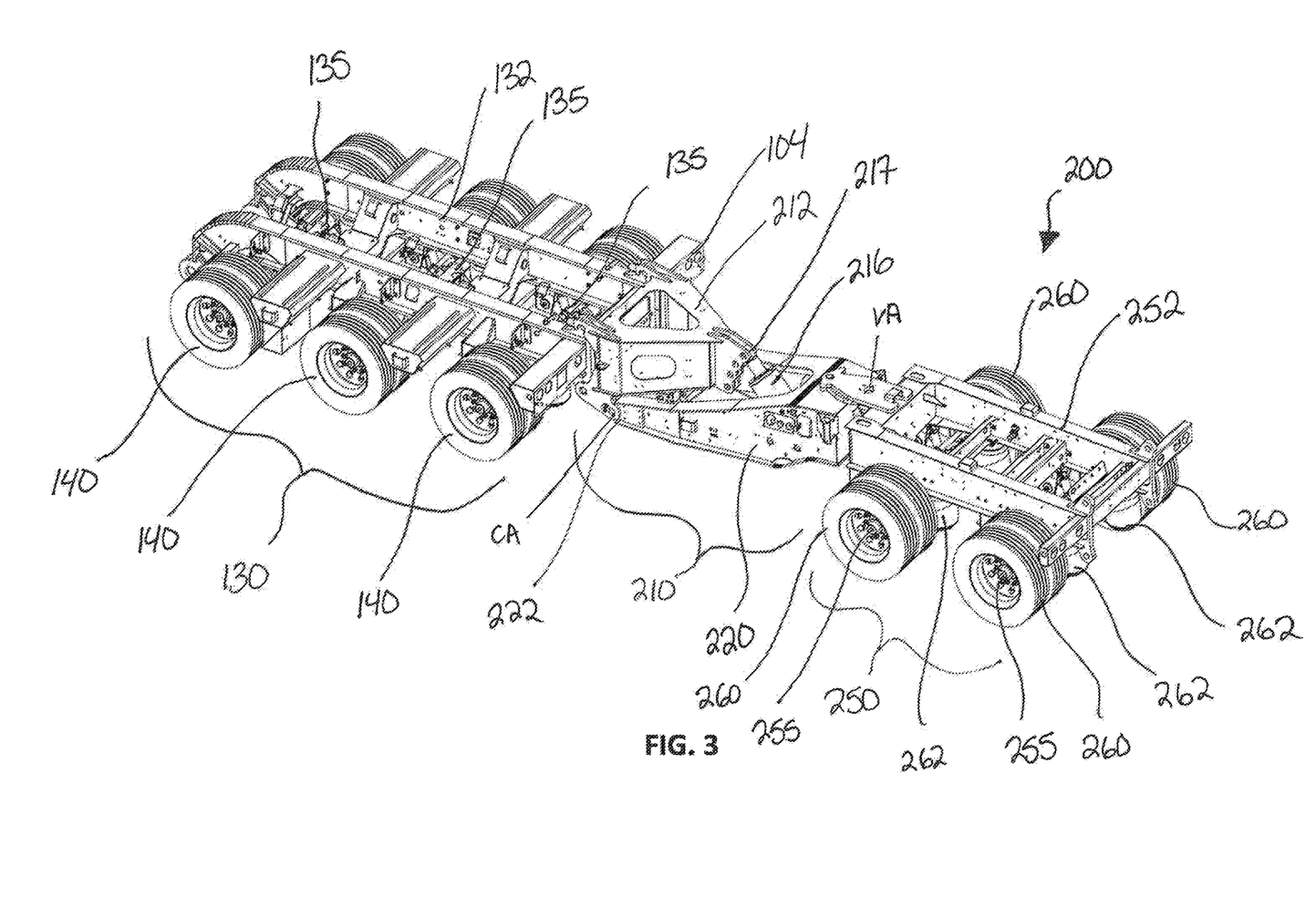
FIG. 3 is a isometric view of an axle assembly of a trailer and a booster of the trailer system shown in FIG. 2.
Figure 4:
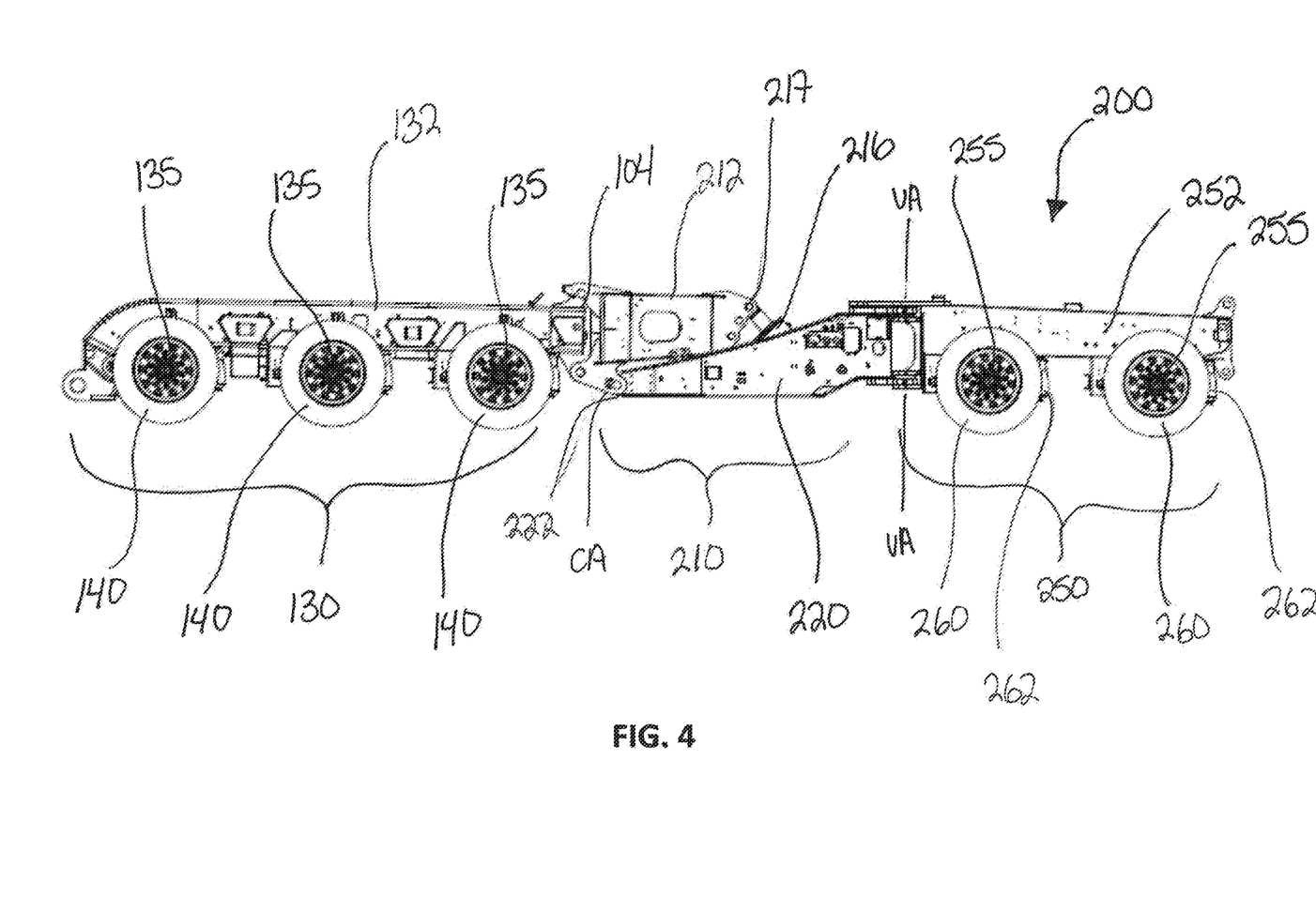
FIG. 4 is a side view of the portions of the trailer system shown in FIG. 3.
Figure 5:
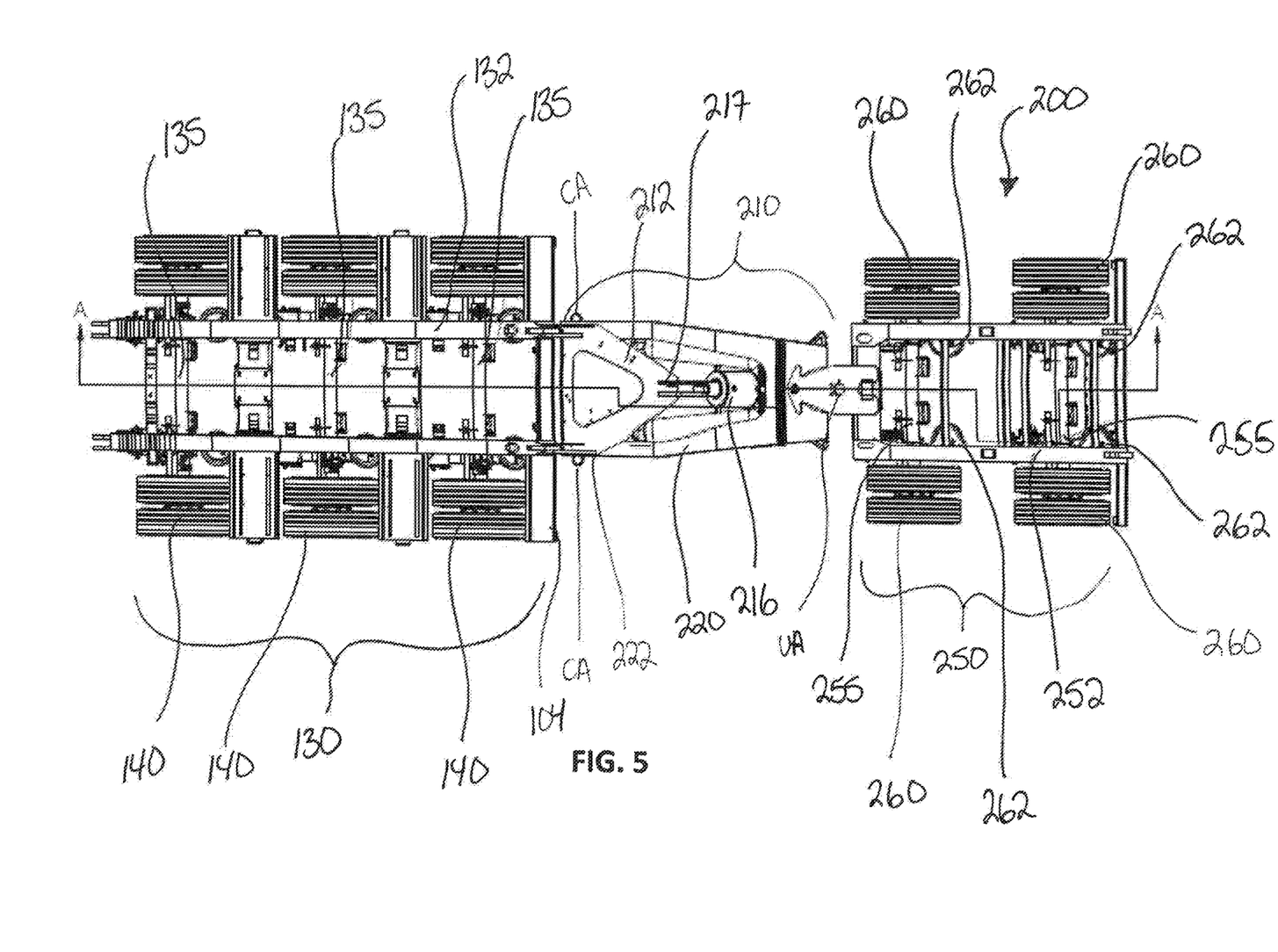
FIG. 5 is a top view of the portions of the trailer system trailer system shown in FIG. 3.

FIGS. 1 and 2 illustrate a trailer system 10 comprising a trailer 100 and a booster 200. The trailer 100 can have a hitch assembly 110, a load bed 120, and an axle assembly 130 having a number of axles 135 and associated ground wheels 140 for supporting a load. The booster 200 can be connected to a rear end 104 the trailer 100 to increase the axle spread of the trailer system 10 and reduce the weight on each axle 135 of the axle assembly 130 of the trailer 100, thereby increasing the weight of a load the trailer system 10 can haul.

The hitch assembly 110 can be provided at a front end 102 of the trailer 100 and is used to connect the trailer 100 and therefore the trailer system 10 to a tow vehicle (not shown), such as a semitruck, tractor unit, etc. The trailer 10 shown in FIGS. 1 and 2 has a hitch assembly 110 that is a goose neck, but a person skilled in the art would appreciate that other configurations of hitch assembly could be used.

The load bed 120 can be provided behind the hitch assembly 110 and can provide a surface where a load is carried on the trailer 100.

The axle assembly 130 can have an axle frame 132 supporting a number of axles 135 with each axle 135 having a number of associated ground wheels 140 provided on the axle 135 (typically four ground wheels 140 per axle 135 or two ground wheels 140 on each side) to allow the trailer 100 to be towed. A person skilled in the art would appreciate the axles 135 can be operably connected to the axle frame 132 by a suspension system, such as an air suspension system. FIGS. 1 and 2 show an axle assembly 130 with three axles 135 and associated ground wheels 140, but more or fewer axles 135 could be provided.

The booster 200 is connected to the rear end 104 of the trailer 100 and has a connection assembly 210, and an axle assembly 250. Referring to FIGS. 3-6, the connection assembly 210 of the booster 200 can have a booster adapter frame 212, a booster hydraulic accumulator tank 214, a booster hydraulic cylinder 216, and a booster spreader frame 220. The axle assembly 130 can include axles 255, a booster suspension frame 252, ground wheels 260 and a booster suspension which can include booster suspension air springs 262, a pressure regulator 312, a booster suspension ride height valve 320, and a supply tank 310.

The booster adapter frame 212 can be attached to the rear end 104 of the trailer 100 and provide a first attachment point 217 for the booster hydraulic cylinder 216.

The booster spreader frame 220 can be provided at a front end of the booster 200 and provide a second attachment point 219 for the booster hydraulic cylinder 216. A front end 222 of the booster spreader frame 220 can be pivotally connected to rear end 104 of the trailer to form a connection point, allowing the booster 200 to pivot upwards and downwards around a horizontal axis CA, relative to the rear end 104 of the trailer 100.

The booster hydraulic cylinder 216 can be connected between the first attachment point 217 on the booster adapter frame 212 and the second attachment point 219 on the booster spreader frame 220 to act against the pivoting of the booster 200 around the front end 222 of the booster spreader frame 220 and axis CA and dampen any pivoting that occurs. The booster hydraulic cylinder 216 can be fluidly connected to the booster hydraulic accumulator tank 214 so that when the booster 200 pivots upwards around axis CA, defined by the connection of the front end 222 of the booster spreader frame 220 to the rear end 104 of the trailer 100, the booster hydraulic cylinder 216 will compress, forcing fluid out of the booster hydraulic cylinder 216 and into the booster hydraulic accumulator tank 214. Because there will already be some fluid in the booster hydraulic accumulator tank 214, this extra fluid, forced out of the booster hydraulic cylinder 216 by its compression, will increase the pressure of the fluid in the booster hydraulic accumulator tank 214 and therefore the pressure of the fluid remaining in the booster hydraulic cylinder 216 making it harder and harder to compress the booster hydraulic cylinder 216 as the booster hydraulic cylinder 216 is further compressed. The more the booster hydraulic cylinder 216 is compressed, the more fluid will be forced out of the booster hydraulic cylinder 216 and into the hydraulic accumulator tank 214 increasing the pressure of the fluid in the hydraulic accumulator tank 214 and causing the booster hydraulic cylinder 216 and the booster hydraulic accumulator tank 214 to act as a damper; acting against the pivoting of the booster 200 upwards around the axis CA, where the front end 222 of the booster spreader frame 220 is pivotally connected to the trailer 100.

The booster 200 can also be pivotally connected to the rear end 104 of the trailer 100 so that the booster 200 can pivot around a vertical axis, VA, relative to the rear end 104 of the trailer 100. The booster spreader frame 220 can be pivotally connected to the booster suspension frame 252 so that the booster 200 can pivot around the vertical axis, VA relative to the rear end 104 of the trailer 100. The booster suspension frame 252 can support the plurality of axles 255 and the ground wheels 260 attached to the axles 255. The booster 200 is shown with an axle assembly 250 having two axles 255 and associated ground wheels 260, but more or fewer axles 255 could be provided.

The pivotal connection between the booster spreader frame 220 and the booster suspension frame 252 around the vertical axis, VA, allows the booster suspension frame 252, the plurality of axles 255 and the ground wheels 260 to pivot relative to the trailer 100 around vertical axis, VA, with the result that the travel direction of the booster suspension frame 252 may not be the same travel direction as the trailer 100, allowing the trailer system 10 to make tighter turn than if the booster suspension frame 252 did not pivot relative to the trailer 100.

Figure 6:
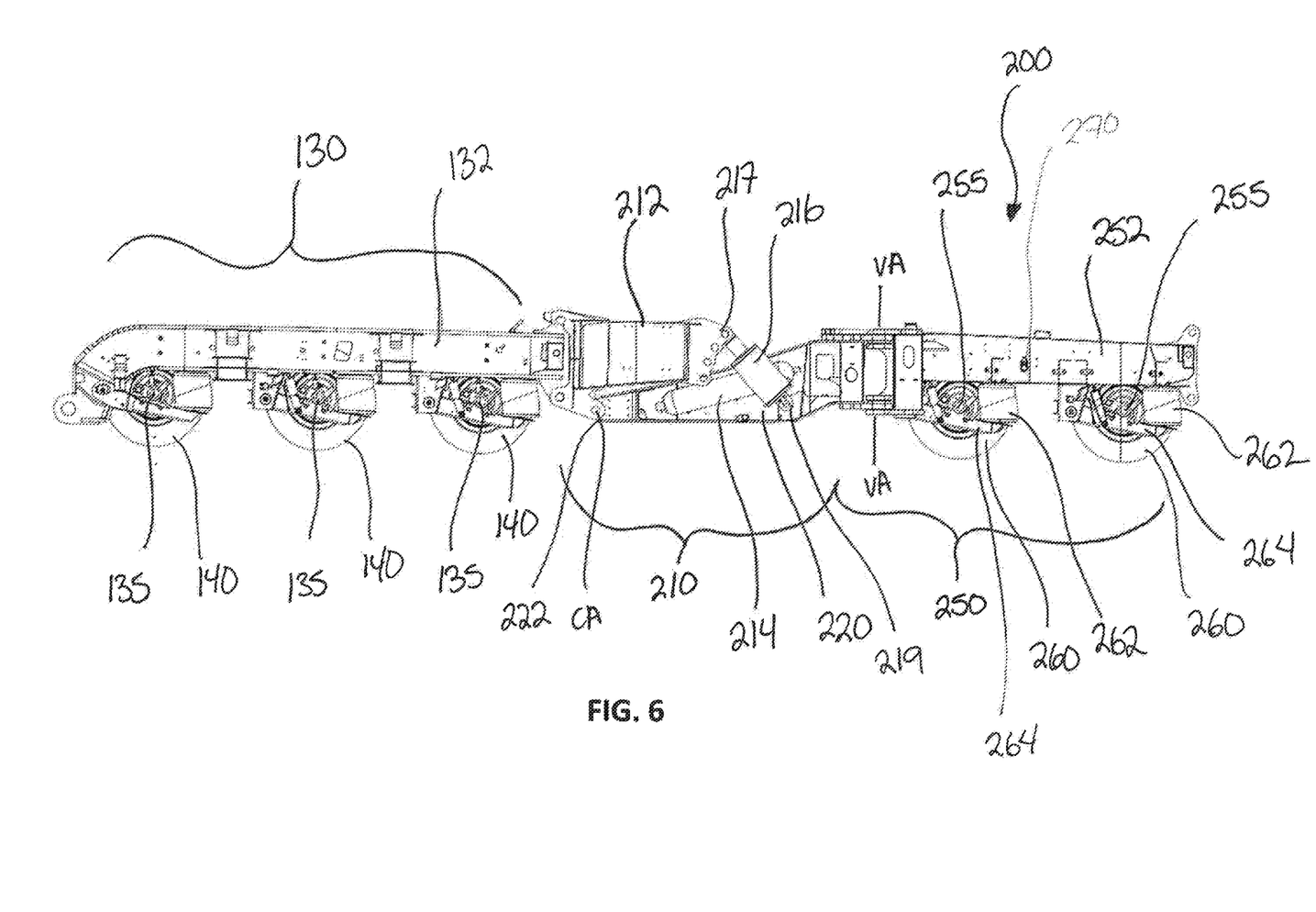
FIG. 6 is a side sectional view of along sectional line A-A in FIG. 5.

Referring to FIG. 6, each axle 255 can be connected to the booster suspension frame 252 by an arm 264. A booster suspension air spring 262 can be provided between each arm 264 and the booster suspension frame 252. Pressurized fluid, such as air, in the booster suspension air spring 262 can set the height the position of the arm 264 and therefore the position of the axle 255 and the associated ground wheels 260 relative to the booster suspension frame 252. By increasing the pressure of the fluid in the booster suspension air springs 262, the booster suspension air springs 262 can be extended, moving the arm 264 downwards and raising the booster suspension frame 252 relative to the ground wheels 260. By decreasing the pressure of the fluid in the booster suspension air springs 262, the booster suspension air springs 262 can be compressed by the load on the booster suspension air springs 262, lowering the booster suspension frame 252 relative to the ground wheels 260.

The booster suspension air springs 262 allow the height of the booster suspension frame 252 relative to the ground wheels 260 to remain at a desired ride height even with loads of varying weight being carried by the trailer system 10. When a load is placed on the trailer 100, the portion of the weight of the load that is transferred to the booster 200 can cause the height of the booster suspension frame 252 relative to the ground wheels 260 to decrease. More pressurized fluid can be supplied to the booster suspension air springs 262 causing the height of the booster suspension frame 252 relative to the ground wheels 260 to increase. The pressure of the fluid in the booster suspension air springs 262 can be increased until the booster suspension frame 252 rises back up to the desired ride height. This allows various loads to be carried by the trailer system 10 and the booster 200 can maintain a desired ride height even with different weights of these loads.

Figure 7:
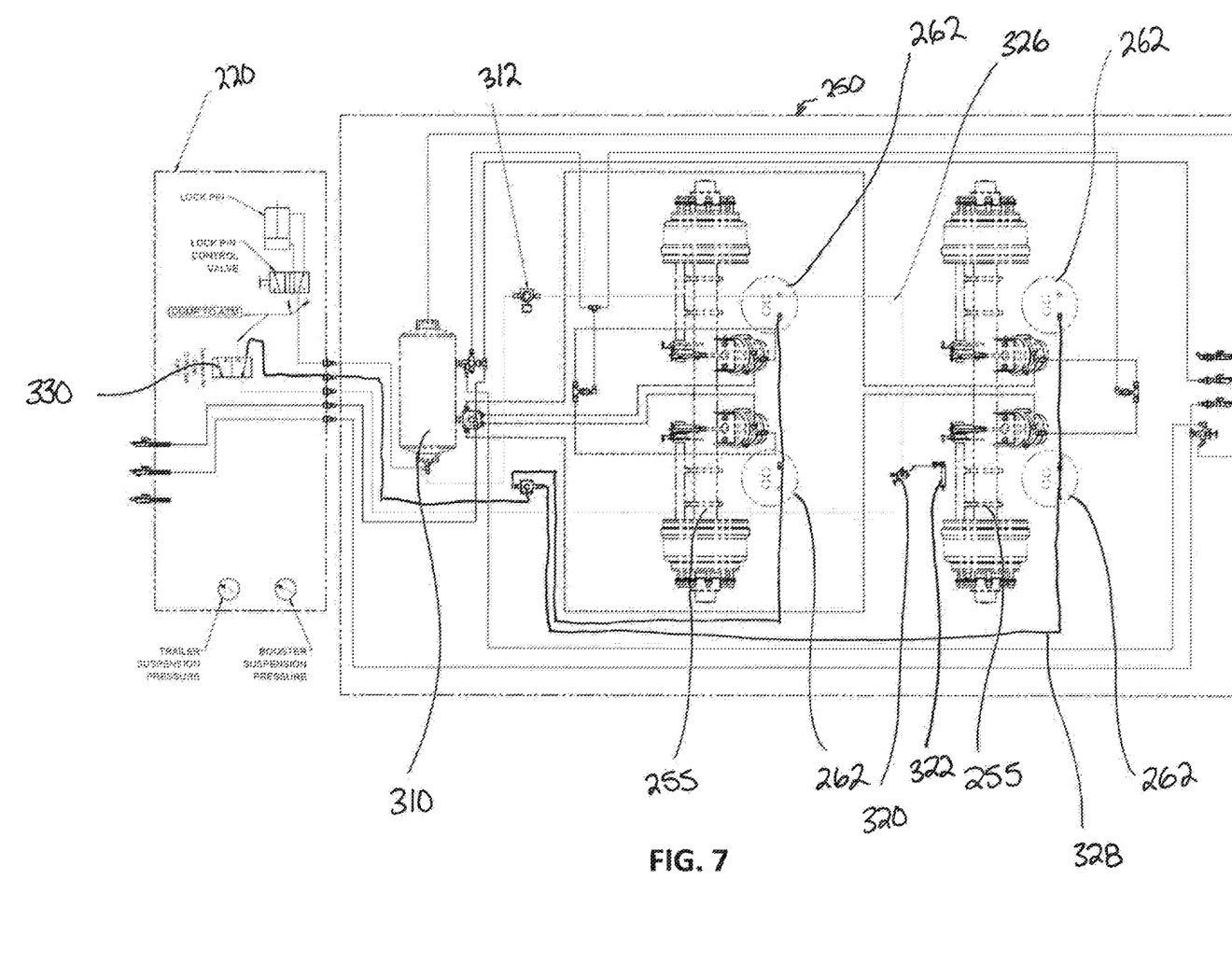
FIG. 7 is a schematic diagram of a suspension system of a booster for a trailer system.

Referring to FIG. 7, a schematic illustration of the booster axle assembly 250 and the air suspension is shown. The booster air springs 262 are supplied with pressurized fluid (such as air) from the supply tank 310. A booster suspension ride height valve 320 is used to control the flow of pressurized fluid between the supply tank 310 and the booster air springs 262 and the booster suspension ride height valve 320 is controlled by a ride height lever 322.

Referring to FIGS. 6 and 7, the booster suspension ride height valve 320 can be used to set the height of the booster suspension frame 252 relative to the ground wheels 260 by allowing pressurized fluid to be directed to the booster suspension air springs 262 when the distance between the booster suspension frame 252 and the axles 255, and therefore the distance between the booster suspension frame 252 and the ground wheels 260, decreases below a desired ride height. When the distance between the booster suspension frame 252 and the ground wheels 260 is at the desired ride height, the ride height lever 322 will be at a level that keeps the ride height valve 320 closed and the pressure inside the booster suspension air springs 262 at constant pressure. The ride height lever 322 can be triggered by the distance between the booster suspension frame 352 and the ground wheels 260 either increasing above the desired ride height or dropping below the desired ride height.

If the distance between the booster suspension frame 352 and the ground wheels 260 increases above the desired ride height, the ride height lever 322 will be moved and the ride height valve 320 can vent pressurized fluid out of the booster suspension air springs 262, such as to atmosphere, until the distance has decreased back to the desired ride height.

If the distance between the booster suspension frame 352 and the ground wheels 260 drops below the desired ride height, the ride height lever 322 will be moved and the ride height valve 320 can be opened allowing more pressurized fluid to be supplied to the booster suspension air springs 262 until the distance has increased back to the desired ride height. When the ride height valve 320 is opened, pressurized fluid (such as air) can flow out of the supply tank 310 through the pressure lines 326 through the open ride height valve 320 back to the suspension air dump 330 and then flow back to the booster suspension air springs 262 through pressure lines 328. This will increase the pressure of the fluid in the booster suspension air springs 262, increasing the distance between the booster suspension frame 252 and the ground wheels 260. The ride height valve 320 can continue to be left open until the distance between the booster suspension frame 252 and the ground wheels 260 has once again reached the desired ride height. At which point, the ride height lever 322 can be engaged, closing the booster suspension ride height valve 320 and stopping the flow of more pressurized fluid into the booster suspension air springs 262 from the supply tank 310.

The pressure of the fluid in the supply tank 310 can be kept higher than the highest pressure desired for the booster suspension air springs 262 so that when the ride height valve 320 is opened, the higher pressure fluid in the supply tank 310 will flow through pressure lines 328 to the booster suspension air springs 262.

In this way, the height of the booster suspension frame 352 can be kept at a desired ride height, a specific distance relative to the ground wheels 260. This desired ride height can be such that the booster 200 carries an amount of the weight of the load on the load bed 120, rather than the ground wheels 140 and axles 135 on the trailer 100.

The pressure regulator 312 can be provided inline with the pressure lines 326 running to the ride height valve 320 to limit the pressure of the fluid supplied from the supply tank 310 to the booster suspension air springs 26 to an upper pressure limit. In one aspect, this upper pressure limit limited by the pressure regulator 312 can be selected based on the maximum ground load allowable to main stability of the trailer 100.

The supply tank 310 can be pressurized with fluid at a higher operating pressure than the upper pressure limit set for the pressure regulator 312. In this manner, the pressure regulator 312 will limit the maximum operating pressure in the booster suspension air springs 262 to the upper pressure limit rather than the higher operating pressure of the supply tank 310. For example, if the fluid in the supply tank 310 is pressurized to 100 psi the pressure regulator 312 can have an upper pressure limit that limits the pressure of the fluid passing through it to a lower pressure, such as 70 psi, and thereby limit the pressure in the booster suspension air springs 262 to 70 psi.

Figure 8:
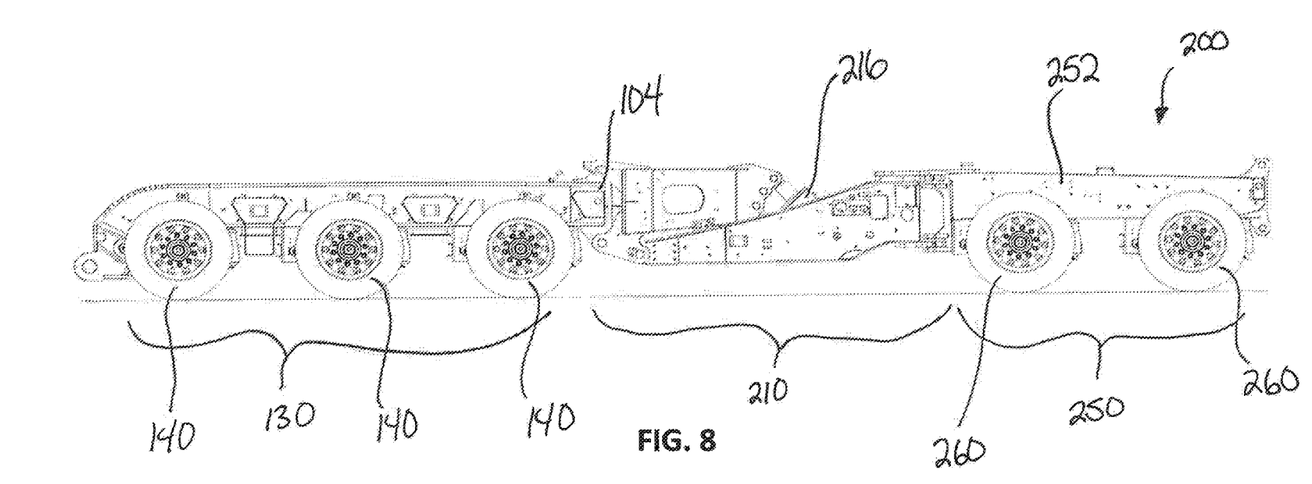
FIG. 8 is a side view of the axle assembly of the trailer and the booster shown in FIG. 3 travelling over level ground.

In operation, when the trailer system 10 is travelling over level ground, as shown in FIG. 8, load equalization between the trailer 100 and booster 200 is achieved by the booster hydraulic accumulator tank 214 pre-charging the booster hydraulic cylinder 216 to the appropriate equilibrium pressure and causing the weight of the load to be distributed between the axle assembly 250 on the booster 200 and axle assembly 130 on the trailer 100.

Figure 9:
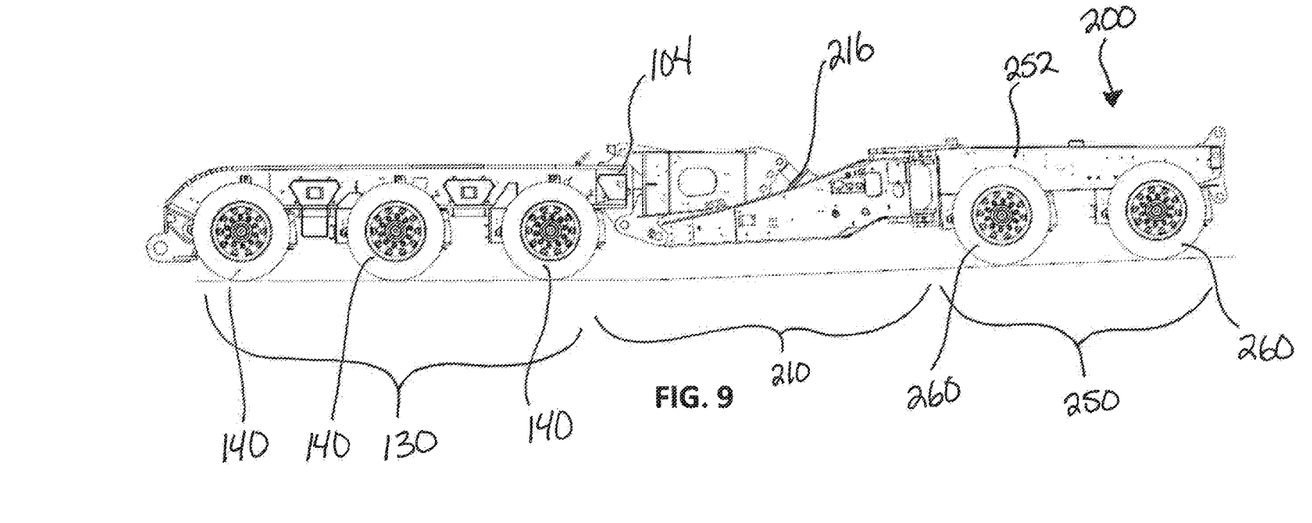
FIG. 9 is a side view of the trailer and the booster shown in FIG. 3 travelling over unlevel ground in an overload condition.

However, when the ground surface is not level, as shown in FIG. 9, the fluid in the hydraulic accumulator tank 214 will expand and compress, changing the pressure in the booster hydraulic cylinder 216 to maintain the equilibrium. When the booster 200 moves upwards relative to the trailer 100, compressing the booster hydraulic cylinder 216, the fluid in the hydraulic accumulator tank 214 will also be compressed, limiting the amount the booster 200 can pivot relative to the rear end 104 of the trailer 100, and the ground load on the booster 200 increases. This can decrease the distance between the booster suspension frame 252 and the ground wheels 260 below the desired right height, which will in turn, open the ride height valve 320 and cause pressurized fluid to be supplied from the supply tank 310 through the pressure lines 326 through the open ride height valve 320, to the suspension air dump 330, and flow back through the pressure lines 328 to the booster suspension air springs 262. This can increase the pressure of the fluid in the booster air springs 262, causing the height of the booster air springs 262 to increase, which will raise the booster suspension frame 252, thereby increasing the distance between the booster suspension frame 252 and the ground wheels 260 on the booster 200 back towards the desired ride height.

By increasing the pressure in the booster suspension air springs 262, more force is placed on the booster hydraulic cylinder 216 as the booster 200 tries to pivot upwards, increasing the pressure of the fluid in hydraulic accumulator tank 214 and increasing the ground load the axles 255 and the ground wheels 260 on the booster 200, with a corresponding decrease of the ground load the axles 135 and the ground wheels 140 on the trailer 100 are subjected to. This decreasing of the ground load on the axles 135 and the ground wheels 140 of the trailer 100 will unload the axle assembly 130 on the trailer and reduce the frictional forces the ground wheels 140 of the trailer are being subjected to by the road surface.

If the pressure regulator 312 is not present to limit the pressure of the fluid supplied to the booster suspension air springs 262, the booster 200 can overload to an unacceptable level. The decreasing of the frictional forces on the ground wheels 140 of the trailer 100 can compromise the stability of the trailer system 10. The booster 200 can rotate around the vertical axis VA relative to the rear end 104 of the trailer 100. When the ground load the ground wheels 140 of the trailer 100 decreases enough relative to the increasing ground load on the ground wheels 260 of the booster 200 and thereby the frictional forces acting on the ground wheels 140 from the road surface decreases, and instead of the trailer system 10 following the travel direction of the trailer 100, the trailer system 10 can start following the travel direction of the booster 200 because the booster 200 can start dragging the ground wheels 140 of the trailer 100 in the travel direction of the booster 200. Because the booster 200 can freely pivot around the vertical axis VA relative to the rear end 104 of the trailer 100, when the trailer system 10 is in a turn, if the frictional forces on the ground wheels 140 of the trailer have decreased enough while the ground load on the ground wheels 260 of the booster 200 has correspondingly increased, this can cause the booster 200 to overcome the frictional forces on the trailer 100 and start pushing the rear end 104 of the trailer 100 around as the booster 200 follows the travel direction of the booster 200. This can cause a dangerous situation, such as the trailer system 10 veering into incoming traffic or off the road.

By incorporating the pressure regulator 312 to limit the amount of pressure of the fluid supplied to the booster suspension air springs 262, an upper pressure limit can be set that would correspond to an upper level of a ground load the booster 200 would experience under normal driving conditions. Therefore, in overloading situations, the pressure of fluid supplied the booster suspension air springs 262 will have an upper pressure limit because of the pressure regulators 312. This limiting of the pressure supplied to the booster suspension air springs 262 can prevent the ground load the ground wheels 260 of the booster 200 are subjected to from increasing enough, relative to a corresponding decrease in the ground load the ground wheels 140 of the trailer 100 are subjected to, that the frictional forces acting on the ground wheels 140 of the trailer 100 decrease enough to create an instability situation and allow the booster 200 to direct the movement of the rear end 104 of the trailer 100 along the travel direction of the booster 200.

Figure 10:
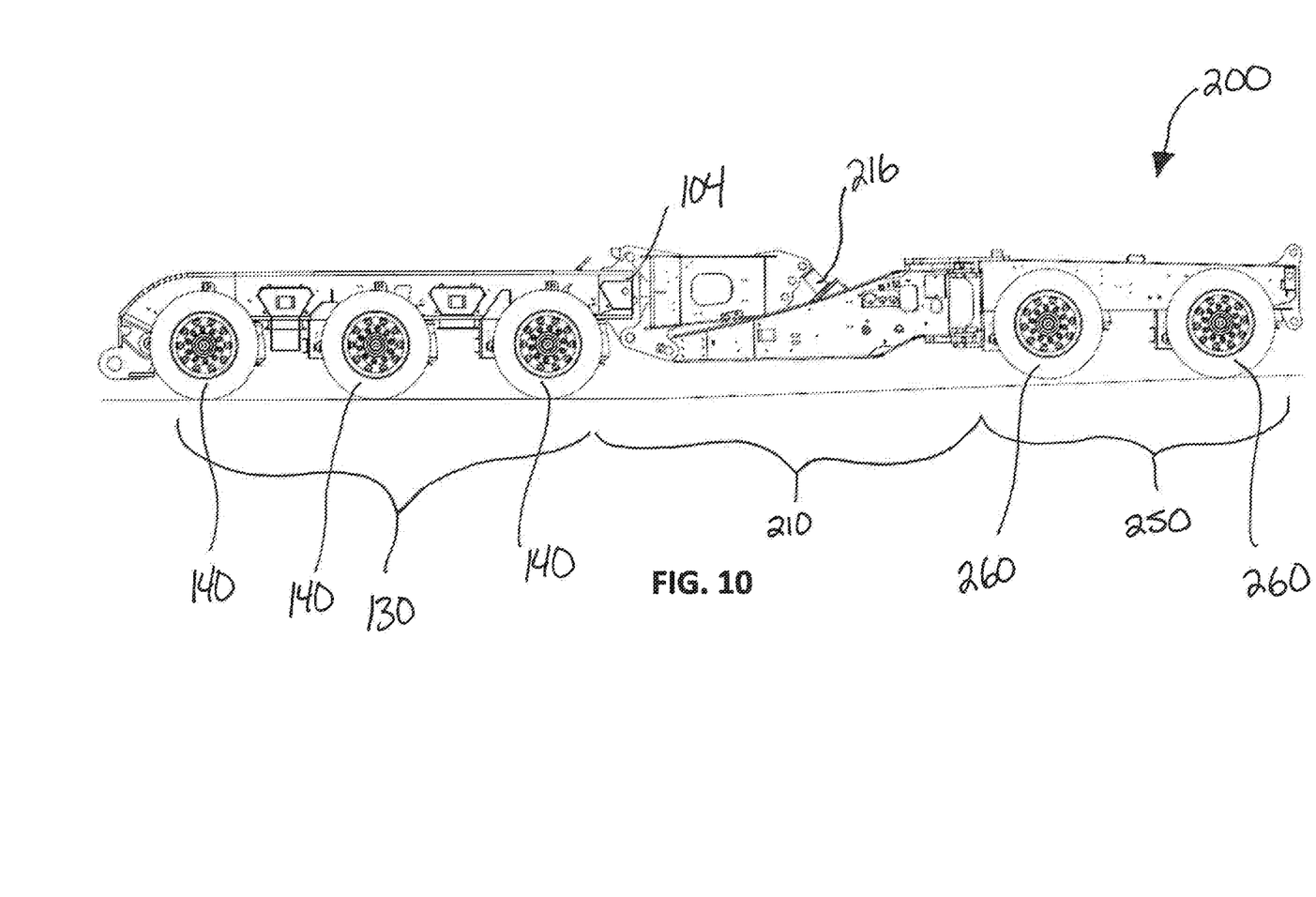
FIG. 10 is a side view of the trailer and the booster shown in FIG. 3 travelling over unlevel ground not in an overload condition.

Referring to FIG. 10, the trailer 100 and booster 200 are travelling over some uneven terrain. However, instead of pressurized fluid being sent to the booster suspension air springs 262 at a high enough pressure to cause instability of the trailer system 10, the upper pressure limit of the pressure regulator 312 can limited the pressure of the fluid supplied to the booster suspension air springs 262. In this manner, the difference between the ground load the ground wheels 260 of the booster 200 are subjected to and the ground load the ground wheels 140 of the trailer 100 are subjected to can be limited; preventing an overloading condition and instability of the trailer system 10.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A trailer system comprising:
   a trailer comprising:
      a front end;
      a rear end;
      a hitch assembly provided at the front end of the trailer;
      a load bed provided behind the hitch assembly; and
      a trailer axle assembly; and
   a booster comprising:
      a connection assembly pivotally connecting the booster to a rear end of the trailer wherein the booster can pivot around a first axis oriented substantially horizontal relative to the rear end of the trailer, the connection assembly comprising a booster hydraulic cylinder to dampen the pivoting of the booster around the first axis; and
      a booster axle assembly comprising:
         a booster suspension frame;
         at least one axle;
         ground wheels provided on each axle;
         a booster suspension having at least one booster suspension air spring controlling a height of the booster suspension frame relative to the ground wheels; and
         a pressure regulator limiting the maximum pressure of a fluid supplied to the at least one booster suspension air spring.

2. The trailer system of claim 1 wherein the hitch assembly is a goose neck.

3. The trailer system of claim 1 wherein the trailer axle assembly comprises: an axle frame; a plurality of axles; and associated ground wheels provided on the axles.

4. The trailer system of claim 3 wherein there are three axles in the trailer axle assembly.

5. The trailer system of claim 1 wherein the connection assembly of the booster further comprises: a booster adapter frame; and, a booster spreader frame.

6. The trailer system of claim 5 wherein the booster adapter frame is connected to the rear end of the trailer and a first attachment point for the booster hydraulic cylinder is provided on the booster adapter frame.

7. The trailer system of claim 6 wherein a front end of the booster spreader frame is pivotally connected to the rear end of the trailer so that the booster spreader frame can pivot around the first axis, and a second attachment point for the booster hydraulic cylinder is provided on the booster spreader frame.

8. The trailer system of claim 7 wherein the booster hydraulic cylinder is connected between the first attachment point on the booster adapter frame and the second attachment point on the booster spreader frame.

9. The trailer system of claim 8 wherein the booster spreader frame is pivotally connected to the booster suspension frame to pivot around a second axis oriented in a substantially vertical direction.

10. The trailer system of claim 1 wherein the booster hydraulic cylinder is fluidly connected to an accumulator tank.

11. The trailer system of claim 1 wherein the booster is pivotally connected to the rear end of the trailer to pivot around a second axis oriented substantially vertical direction.

12. The trailer system of claim 1 further comprising a booster suspension ride height valve controlling the supply of pressurized fluid to the at least one booster suspension air spring.

13. The trailer system of claim 12 wherein the at least one booster suspension air spring is supplied with pressurized fluid from a supply tank.

14. The trailer system of claim 13 wherein the booster suspension ride height valve opens when a distance between the booster suspension frame and the ground wheels decreases below a desired ride height and the booster suspension ride height valve closes when the distance between the booster suspension frame and the ground wheels reaches the desired ride height.

15. The trailer system of claim 14 wherein the pressure regulator is provided inline in a pressure line running between the supply tank and the booster suspension ride height valve.

16. The trailer system of claim 14 further comprising a ride height lever to open and close the booster suspension ride height valve.

17. The trailer system of claim 1 wherein the at least one booster suspension air spring raises and lowers the booster suspension frame relative to the ground wheels of the booster.

18. A booster for connection behind a trailer, the booster comprising:
   a connection assembly pivotally connectable to a rear end of the trailer wherein the booster can pivot around a first axis oriented substantially horizontal relative to the rear end of the trailer, the connection assembly comprising a booster hydraulic cylinder to dampen the pivoting of the booster around the first axis; and
   an axle assembly comprising:
      a booster suspension frame;
      at least one axle;
      ground wheels provided on each axle;

a booster suspension having at least one booster suspension air spring controlling a height of the booster suspension frame relative to the ground wheels; and a pressure regulator limiting the maximum pressure of a fluid supplied to the at least one booster suspension air spring.

19. The booster of claim 18 wherein the connection assembly of the booster further comprises: a booster adapter frame; and, a booster spreader frame.

20. The booster of claim 19 wherein the booster adapter frame is connectable to the rear end of the trailer and a first attachment point for the booster hydraulic cylinder is provided on the booster adapter frame.

21. The booster of claim 20 wherein a front end of the booster spreader frame is pivotally connectable to the rear end of the trailer so that the booster spreader frame can pivot around the first axis, and a second attachment point for the booster hydraulic cylinder is provided on the booster spreader frame.

22. The booster of claim 21 wherein the booster hydraulic cylinder is connected between the first attachment point on the booster adapter frame and the second attachment point on the booster spreader frame.

23. The booster of claim 22 wherein the booster spreader frame is pivotally connected to the booster suspension frame to pivot around a second axis oriented in a substantially vertical direction.

24. The booster of claim 18 wherein the booster hydraulic cylinder is fluidly connected to an accumulator tank.

25. The booster of claim 18 wherein the booster is pivotally connected to the rear end of the trailer to pivot around a second axis oriented substantially vertical direction.

26. The booster of claim 18 further comprising a booster suspension ride height valve controlling the supply of pressurized fluid to the at least one booster suspension air spring.

27. The booster of claim 26 wherein the at least one booster suspension air spring is supplied with pressurized fluid from a supply tank.

28. The booster of claim 27 wherein the booster suspension ride height valve opens when a distance between the booster suspension frame and the ground wheels decreases below a desired ride height and the booster suspension ride height valve closes when the distance between the booster suspension frame and the ground wheels reaches the desired ride height.

29. The booster of claim 28 wherein the pressure regulator is provided inline in a pressure line running between the supply tank and the booster suspension ride height valve.

30. The booster of claim 18 wherein the at least one booster suspension air spring and raises and lowers the booster suspension frame relative to the ground wheels of the booster.

* * * * *